Jan. 7, 1941.  A. A. APFELBECK  2,228,025
GRATER
Filed Dec. 11, 1939   2 Sheets-Sheet 2

Inventor
A. A. Apfelbeck

By Clarence A. O'Brien
and Hyman Berman
Attorneys

Patented Jan. 7, 1941

2,228,025

UNITED STATES PATENT OFFICE 2,228,025

GRATER

Andrew A. Apfelbeck, Belleville, Ill.

Application December 11, 1939, Serial No. 308,706

1 Claim. (Cl. 146—174)

The present invention relates to grating devices for foods such as vegetables and the like, and has for its primary object to provide a motor-driven conical grating head having the cutting teeth struck outwardly from the surface thereof and arranged in longitudinally extending rows with the teeth of each row staggered and overlapping with the teeth of adjacent rows so that a cutting action is provided for the entire surface of the grater upon the rotation thereof.

A further object is to provide a casing for the conical head or drum of the grater and provided with a plurality of feed hoppers in order that various types of food may be simultaneously fed to the grater for mixing during the grating action.

A still further object is to provide a shield for the end of the casing to prevent the discharge of the food outwardly beyond the end of the grater.

A still further object is to provide a device of this character of simple and practical construction, which is efficient and reliable in performance, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which—

Figure 1:
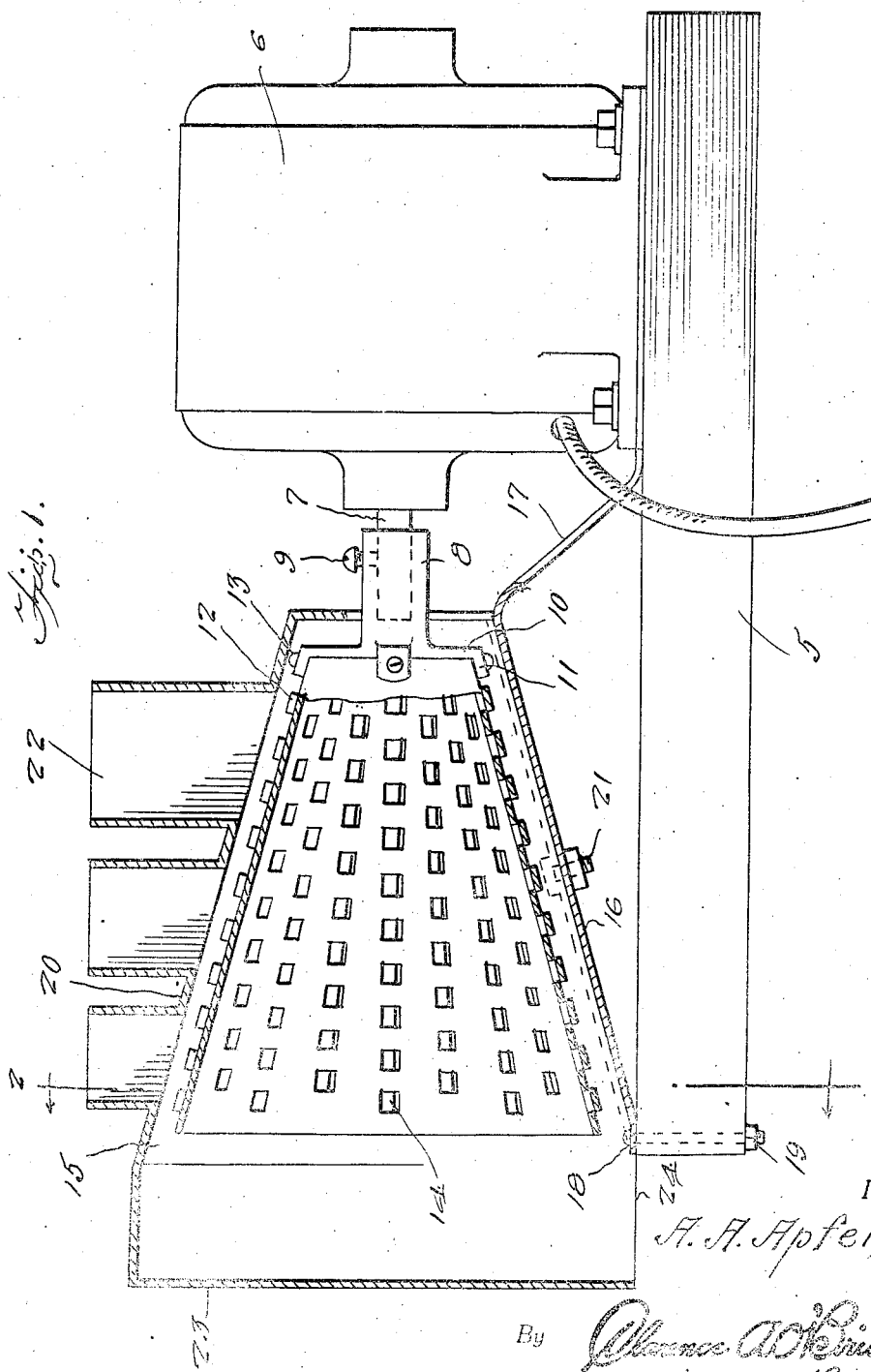
Figure 1 is a side elevational view with parts broken away and shown in section.
Figure 2:
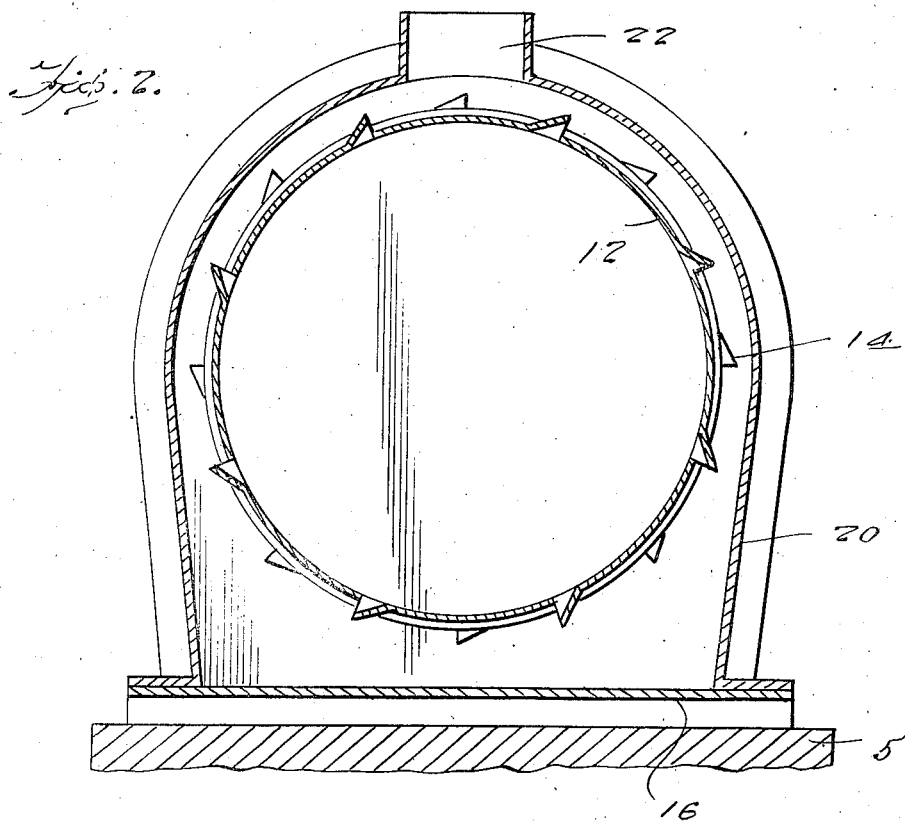
Figure 2 is a vertical sectional view taken substantially on a line 2—2 of Figure 1.
Figure 3:
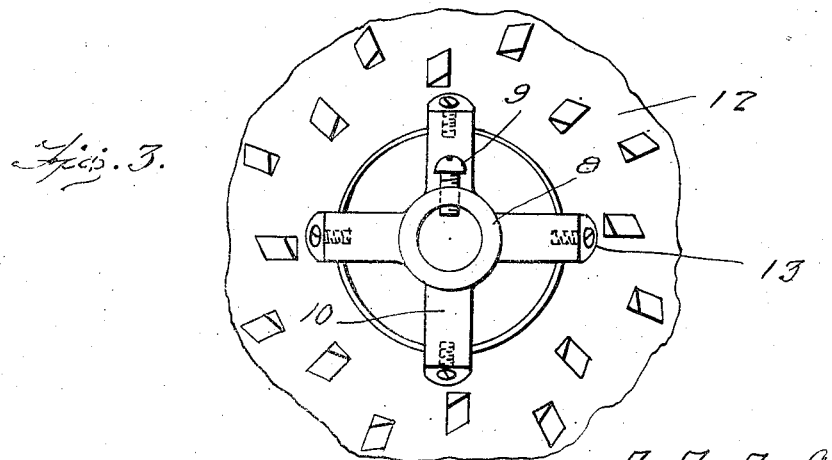
Figure 3 is a fragmentary end elevational view of the conical head or drum of the grater and showing the attaching collar therefor.

Referring now to the drawings in detail, the numeral 5 designates a suitable supporting base or block on which an electric motor 6 is mounted, the motor having a shaft 7 projecting from one end thereof. A collar 8 is secured to the shaft by means of a set screw 9, the outer end of the collar being provided with a plurality of radially extending arms 10 which are bent forwardly at an inclined angle as shown at 11.

The arms 10 abut the smaller end of a frustro-conical grater head or drum 12, the outwardly extending ends 11 of the arms being secured to the outer surface of the drum by screws 13 or the like. Struck from the surface of the drum are a plurality of teeth 14 of substantially rectangular form, and arranged in longitudinal rows, as clearly shown in Figure 1 of the drawings, with the teeth of adjacent rows staggered and arranged with their edges overlapping longitudinally so that the entire outer surface of the drum presents a cutting surface to the material fed thereto.

A casing 15 surrounds the drum in spaced relation therefrom, the casing including a bottom portion 16 having an extension 17 for attaching under the motor 6 and having a flattened front end or edge 18 which is secured to the base 5 by means of bolts 19. The casing further includes a top portion 20 which is secured to the bottom portion by means of bolts 21 and projecting upwardly from the top portion are a plurality of longitudinally spaced hoppers 22 adapted for feeding the material to the drum 12. The front end of the top portion 20 of the casing is provided with a vertical shield 23 which is spaced forwardly from the front open end of the drum 12 and prevents the grated material from being thrown forwardly from the grater.

The front edge of the bottom portion 16 of the casing terminates short of the shield 23 whereby to provide a discharge opening 24 in the bottom of the casing beneath which is a suitable receptacle may be placed for receiving the material from the grater.

In the operation of the device it will be apparent that various types of material may be fed into the hoppers 22 and will become mixed during the grating thereof.

It is believed the details of construction, operation and advantages of the device will be readily understood from the foregoing without further detailed explanation.

Having thus described the invention, what I claim is:

A grater comprising a flat rectangular base, a motor on said base adjacent one end thereof, a frusto-conical grater shell fast on the armature shaft of the motor and extending therefrom to the opposite end of the base with the larger end outermost and forming the front end thereof, said shell having peripheral teeth arranged in rows longitudinally of the shell, a casing surrounding and enclosing the shell in spaced relation thereto and having top and bottom walls diverging to the front end of the shell, said casing being open at its bottom in front of said shell to provide a discharge aperture in said casing at the larger end of the shell for the grated material and having a vertical front wall forming a baffle for deflecting the grated material towards said aperture, and a plurality of hoppers upstanding from said casing for feeding different materials simultaneously into the same, said hoppers being spaced apart longitudinally of the shell to arrange the same successively further from the discharge aperture, whereby the material fed therefrom may be mixed for different periods of time under rotation of said shell for a given time period.

ANDREW A. APFELBECK.